US012795784B2

(12) United States Patent
Wetzel

(10) Patent No.: US 12,795,784 B2
(45) Date of Patent: *Nov. 10, 2026

(54) HEAT LAMP

(71) Applicant: Animal Lamps, LLC, Iowa City, IA (US)

(72) Inventor: James Wetzel, Iowa City, IA (US)

(73) Assignee: ANIMAL LAMPS, LLC, Iowa City, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/001,031

(22) Filed: Dec. 24, 2024

(65) Prior Publication Data

US 2025/0142678 A1 May 1, 2025

Related U.S. Application Data

(63) Continuation-in-part of application No. 18/240,131, filed on Aug. 30, 2023, now Pat. No. 12,219,671, which is a continuation of application No. 18/449,917, filed on Aug. 15, 2023, now abandoned.

(60) Provisional application No. 63/517,031, filed on Aug. 1, 2023.

(51) Int. Cl.

| | |
|---|---|
| ***H05B 3/44*** | (2006.01) |
| ***A01K 1/00*** | (2006.01) |
| ***A01K 1/02*** | (2006.01) |
| ***H05B 1/02*** | (2006.01) |
| ***H05B 3/00*** | (2006.01) |
| ***H05B 33/22*** | (2006.01) |

(52) U.S. Cl.
CPC ............. *H05B 3/44* (2013.01); *A01K 1/0076* (2013.01); *A01K 1/0218* (2013.01); *H05B 1/0202* (2013.01); *H05B 3/0038* (2013.01); *H05B 33/22* (2013.01); *A01K 2227/108* (2013.01); *H05B 2203/032* (2013.01)

(58) Field of Classification Search
None
See application file for complete search history.

(56) References Cited

U.S. PATENT DOCUMENTS

| | | | | |
|---|---|---|---|---|
| 1,686,865 A * | 10/1928 | Klotz | F24C 7/065 | 607/81 |
| 2,277,697 A | 3/1942 | Grier | | |
| 2,795,724 A | 6/1957 | Beeson | | |
| 2,879,369 A * | 3/1959 | Huseby | F24C 7/065 | 219/520 |
| 2,917,616 A * | 12/1959 | Thomson | F24C 7/065 | D23/385 |

(Continued)

FOREIGN PATENT DOCUMENTS

| | | |
|---|---|---|
| DE | 202008003928 U1 | 5/2008 |
| GB | 1275977 A | 6/1972 |

*Primary Examiner* — Thor S Campbell
(74) *Attorney, Agent, or Firm* — SHUTTLEWORTH & INGERSOLL, PLC; Jason R. Sytsma

(57) ABSTRACT

A heat source that emits infrared radiation; a parabolic reflective sheet surrounding the heat source with a first emission area tuned to direct infrared energy directly downward out of the first emission area. The parabolic reflective sheet has an aspect ratio of 1/4 and the heat source is centered at the focus of the parabolic reflective sheet to provide a substantially consistent temperature in an area on the ground directly beneath the parabolic reflective sheet.

19 Claims, 18 Drawing Sheets

(56) References Cited

U.S. PATENT DOCUMENTS

| | | | | | |
|---|---|---|---|---|---|
| 3,139,881 | A * | 7/1964 | Fannon, Jr. | A01K 31/20 | 126/92 R |
| 3,179,789 | A * | 4/1965 | Gialanella | F24C 7/065 | 338/237 |
| 3,564,200 | A * | 2/1971 | Governale | F24C 7/043 | 165/53 |
| 3,786,230 | A * | 1/1974 | Brandenburg, Jr. | F24C 7/043 | 219/508 |
| 3,916,151 | A * | 10/1975 | Reix | H05B 3/50 | 392/440 |
| 4,319,125 | A * | 3/1982 | Prince | F24D 5/08 | 237/70 |
| 4,348,986 | A * | 9/1982 | Marrs | A01K 1/0218 | 119/508 |
| 4,390,125 | A * | 6/1983 | Rozzi | F23N 5/245 | 126/92 AC |
| 4,626,659 | A * | 12/1986 | Charmes | F24C 7/065 | 392/408 |
| 4,700,661 | A | 10/1987 | Lawson | | |
| 4,703,154 | A * | 10/1987 | Ikegami | H05B 3/30 | 219/544 |
| 4,727,854 | A * | 3/1988 | Johnson | F24C 1/10 | 126/91 A |
| 4,766,524 | A | 8/1988 | Ogawa et al. | | |
| 4,916,580 | A | 4/1990 | Sano et al. | | |
| 5,049,725 | A * | 9/1991 | Abramson | F26B 3/30 | 392/420 |
| 5,138,134 | A * | 8/1992 | Ellison | A47G 1/0616 | 392/436 |
| 5,621,846 | A * | 4/1997 | Smith | F24C 7/065 | 416/246 |
| 5,626,125 | A * | 5/1997 | Eaves | F24D 5/08 | 126/91 A |
| 6,138,662 | A * | 10/2000 | Jones | F24D 5/08 | 126/91 A |
| 6,154,606 | A * | 11/2000 | Shaw | F24C 7/065 | 392/360 |
| 6,687,456 | B1 * | 2/2004 | Woo | H01L 21/67115 | 392/424 |
| 7,254,319 | B2 * | 8/2007 | Bonnin | H05B 3/0038 | 392/407 |
| 8,233,784 | B2 * | 7/2012 | Zenteno | H05B 3/008 | 392/407 |
| 8,396,355 | B2 * | 3/2013 | Jones | F24D 5/08 | 392/407 |
| 8,865,602 | B2 * | 10/2014 | Ranish | H05B 3/0047 | 392/416 |
| 9,237,605 | B2 | 1/2016 | Andreasen et al. | | |
| 11,564,373 | B2 | 1/2023 | Petersen | | |
| 12,219,671 | B1 * | 2/2025 | Wetzel | A01K 1/0218 | |
| 2014/0202394 | A1 * | 7/2014 | Andreasen | F24C 7/065 | 392/424 |
| 2020/0359591 | A1 * | 11/2020 | Petersen | H05B 3/44 | |

* cited by examiner

HEAT LAMP

CROSS-REFERENCE TO RELATED APPLICATIONS

The present application is a Continuation-In-Part of U.S. patent application Ser. No. 18/240,131 filed Aug. 30, 2023, which is a continuation of U.S. patent application Ser. No. 18/449,917 filed Aug. 15, 2023, which claims the benefit of Provisional Application No. 63/517,031 filed Aug. 1, 2023, which are hereby incorporated by reference in their entirety.

TECHNICAL FIELD

This disclosure relates, generally, to a heat lamp, and, more specifically, this disclosure relates to a low wattage electrical heat lamp with thermo-regulation, artificial illumination, and targeted infrared emission.

BACKGROUND INFORMATION

Pork is the most consumed meat in the world. In the United States, it is a $23 billion industry with more than 60,000 pork producers. Iowa is the largest pork producing state in the country. Farmers sell their pork by the pound and continuously look for ways to optimize the health of their pigs to maximize yield. In a traditional farrowing operation, when close to birth, sows are transferred to a crate within a room containing several crates. Each sow gives birth to and raises her piglets in a single crate for approximately three weeks. Sows require an ambient room temperature of approximately 72° F. for optimal health and maximum milk production.

New born and very young pigs lack adequate internal heat production to thrive in this environment, requiring, only inches from the sow, an ambient temperature of approximately 95° F. Therefore, rooms are kept at 72° F. for sows, and heat lamps are commonly used to create a warm zone within a crate for newborn and young pigs. A common method is to suspend one or more heat lamps over the crates.

The infrared component of the electromagnetic spectrum consists of near, mid, and far infrared. Mammalian skin in general, pig skin in particular, and the water content of a body, are exceptionally efficient absorbers of infrared radiation. Therefore, impinging infrared radiation readily transfers heat to a piglet, providing the external heat it needs.

Prior art heat lamps for new born and young pigs typically use ~150 watt bulbs to provide heat. These light bulbs generally have a maximum stated life of approximately 6,000 hours but often fail well before that time, and suffer from several shortcomings. For example, light bulbs burn out at random. If this occurs overnight or otherwise unsupervised, piglets can go hours without heat, causing significant harm or death. Due to corrosion, light bulbs can become fused to their sockets making simple replacement impossible and requiring an entirely new lamp fixture. Light bulbs, being made of glass, break frequently before they burn out. Anything entering a traditional facility must be sterilized; changing a light bulb and/or a fixture becomes a significant and expensive task.

Prior art heat lamps also provide uneven heat distribution. It is typically very hot in a small, basically circular area below the heat lamp hot enough to burn the animals, with the temperature decreasing rapidly from the center. The optimal temperature is a restricted to a narrow annular area region, making it difficult for the piglets to find a comfortable place to lie. This contributes to lay-on mortality: the death of a piglet crushed by the sow. If a piglet cannot find heat from the lamp, it will seek it from its mother, who is very large and not always aware of the piglets' location.

Prior art heat lamps provide heat to animals via infrared radiation produced by a resistive filament heated to a very high temperature inside an evacuated glass bulb. The radiation emitted by this hot element follows the Stefan-Boltzmann law, where at a temperature of approximately 3000 K, the filament's emission spectrum is comparable to the Sun, including visible light as well as infrared. Visible light does not heat the pigs but is used by farmers to see the goings-on in the crate more easily, especially at night when farmers do not want to disturb the sows by turning on overhead lights.

According to the Stefan-Boltzmann law, the hotter the filament, the more radiation is emitted. Heat is transferred via three processes: conduction, convection, and radiation. A hot object will transfer its heat to the cooler environment until reaching thermal equilibrium with the environment. If it cannot easily conduct or convect heat away, radiation is the only mechanism for a hot object to reach thermal equilibrium with its environment. A light bulb is constructed with a vacuum around the filament to limit conduction and convection, which would otherwise increase the rate of heat transfer away from the filament, lowering its temperature and thus reducing the amount of radiation it emits.

Prior art industrial heaters can heat large spaces by using extended tubular heating elements surrounded by a reflective shroud, energized electrically or by burning propane or the like, consuming large amounts of energy and heating the element to very high temperatures. As these elements are not kept under vacuum, they are designed to reach very high temperatures to offset the energy losses to conduction and convection which lower the element temperature and reduce the amount of radiation they emit. Any system that uses tubular heating elements directly exposed to the ambient air must be wary of drafts and other air currents that can quickly lower the element's temperature, causing a significant drop in infrared radiation emission. One such example can be found in U.S. Pat. No. 4,727,854 to Johnson, which discloses an infrared emitter in the form of a metal tube charged with hot gaseous effluent by a fuel-fired burner with a reflector to direct radiant energy from the tube toward the building's floor. Johnson uses a hexagonal or an arc-shaped reflector. These reflectors direct heat generally downward but not evenly.

Considering the uneven heat distribution, visible spectrum emission, and fragility, prior art heat lamps are overpowered, ill-suited, and inefficient for heating several animals.

The prior art fails to adequately address several critical shortcomings, including energy inefficiency, durability, and safety concerns. Traditional heat lamps rely on high-wattage light bulbs, which emit a significant portion of their energy as visible light rather than infrared radiation. They are prone to breakage, overheating, and uneven heat distribution. In contrast, the inventions described below optimize energy use, employ robust materials for extended durability, and incorporate advanced thermal management for safety. Supported by experimental data, these improved heat lamps represent a significant advancement over existing solutions.

The improved innovations described herein are particularly beneficial for agricultural applications, such as farrowing operations, where maintaining precise temperature control is critical to animal health. The improved heat lamp's optimized power range, durable construction, and safety features enable it to perform reliably under demanding conditions while minimizing energy costs and maintenance requirements. These attributes make it an invaluable tool for farmers seeking to improve animal welfare and operational efficiency.

Accordingly, there is a need for an improved heat lamp with more even heat distribution, better durability, careful thermal management, and optimized infrared emission for maximum energy absorption.

SUMMARY

Disclosed herein is a heat lamp for heating a coverage area on a floor. The heat lamp comprises a heat source that emits infrared radiation; a reflective sheet surrounding the heat source with a first emission area tuned to direct infrared energy directly downward out of the first emission area; and an outer sheet surrounding the reflective sheet with an insulation gap between the outer sheet and the reflective sheet, forming a second emission area directed downward out of the insulation gap. A total emission area of the heat lamp comprises the first emission area plus the second emission area, and the total emission area is substantially equal to the coverage area of the heat lamp irrespective of the heat lamp's height above the floor.

In an embodiment, a parabolic reflective sheet with an aspect ratio of 1/4 is provided with the heat source centered at the focus of the parabolic reflective sheet, to provide a substantially uniform radiant density in an area on the ground directly beneath the parabolic reflective sheet.

In an embodiment, an end reflector is positioned on opposite ends of the reflective sheet to attach the reflective sheet to the outer sheet. Each end reflector has tabs that extend into corresponding slots in the outer sheet to minimize conduction of heat from the reflective sheet to the outer sheet. The reflective sheet can further comprise tabs on respective ends. The end reflector has corresponding slots to receive the tabs of the reflective sheet to join the reflective sheet to each end reflector while minimizing conduction of heat from the reflective sheet to each end reflector. Each end reflector includes a receiving hole with at least two nubs projecting into the receiving hole for an effective diameter equal to that of the heat lamp to minimize conduction of heat from the heat lamp to the end reflector, thereby minimizing conduction of heat to the reflective sheet and the outer sheet. Each end reflector has a reflective surface to direct infrared radiation away from the outer sheet.

In an embodiment, a heat amplifier is formed by the insulation gap between the reflective sheet and the outer sheet. The heat amplifier emits heat by radiating out of the second emission area to the coverage area. In some embodiments, the reflective sheet is elongated with bilateral symmetry along a longitudinal axis, folded to a generally parabolic-shape around the heat source. The reflective sheet can also comprise a plurality of heat reflective surfaces to maximize heat reflection downward out of the first emission area. The plurality of heat reflective surfaces can include at least three heat reflective surfaces, each connected to its adjacent surface at an obtuse angle, to maximize reflection. The reflective sheet can be a polished reflective surface to reflect infrared radiation from the infrared heating element. In some embodiments, a tension hanger can extend the longitudinal length of the outer sheet to connect an electrical housing at one end to a cap at the other end. The tension hanger can further comprise a threaded rod, a hook plate positioned on the tension hanger and rotatable about the threaded rod, and a locking nut that fixes the relative position of the hook plate to the outer sheet.

In an embodiment, an indicator light is connected in parallel with the heat source to project light out of the second emission area to provide a visual indication of the total emission area. A normally open electrical thermostat can be connected between the indicator light and a power source that closes when a temperature in the insulation gap reaches a threshold level, signifying that the heat source is operational. In some embodiments, the heat source is an infrared heating element.

In yet another embodiment, a method of warming piglets in a coverage area on a floor of a farrowing pen is disclosed. The method comprises providing a heat lamp comprising a heat source that emits infrared radiation, a reflective sheet around the heat source, and an outer sheet around the reflective sheet with an insulation gap between the outer sheet and the reflective sheet; and tuning an intensity of the infrared radiation at the coverage area based on a distance of the heat source from the floor of the farrowing pen, the wattage of the heat source, and the total emission area of the heat lamp.

In an embodiment, tuning the intensity of the infrared radiation at the coverage area comprises constraining the wattage of the heat source to between 100 and 160 watts, or constraining the distance of the heat source from the floor of the farrowing pen to 16 inches and constraining the coverage area to 100 square inches, or a combination thereof.

BRIEF DESCRIPTION OF THE DRAWINGS

These and other features and advantages of the present invention will be better understood by reading the following detailed description, taken together with the drawings wherein.

Figure 14A:
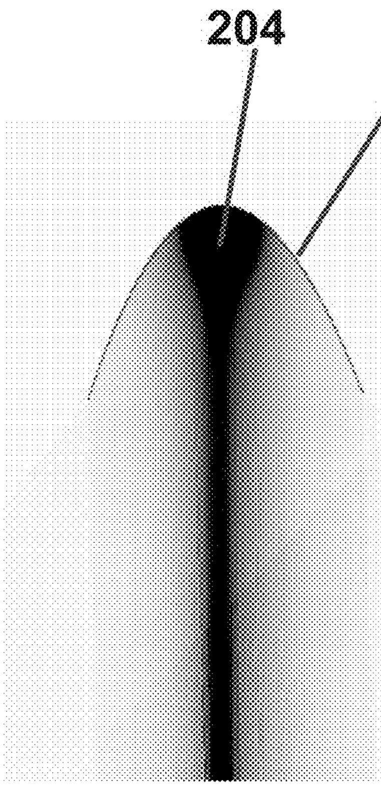
Figure 14B:
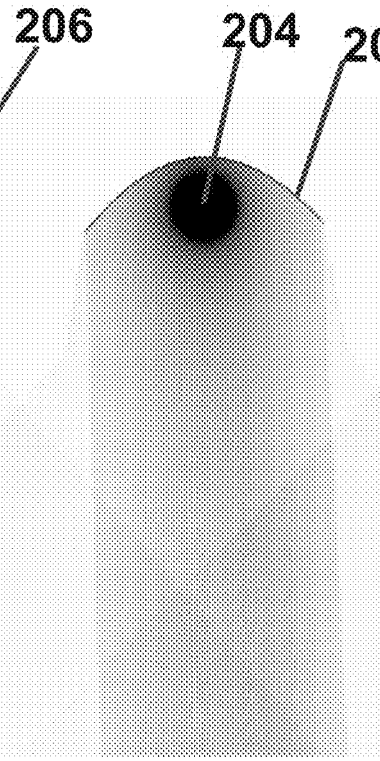

FIG. **14*a* shows the reflective pattern of a heat shield shaped as a parabola with an aspect ratio larger than the parabolic heat shield shown in FIG. 14*b***.

FIG. **14*b*** shows the reflective pattern of a heat shield shaped as a parabola according to this disclosure with an aspect ratio of 1/4.

FIG. **14*c*** shows the reflective pattern of a heat shield shaped as an arc.

Figure 15:
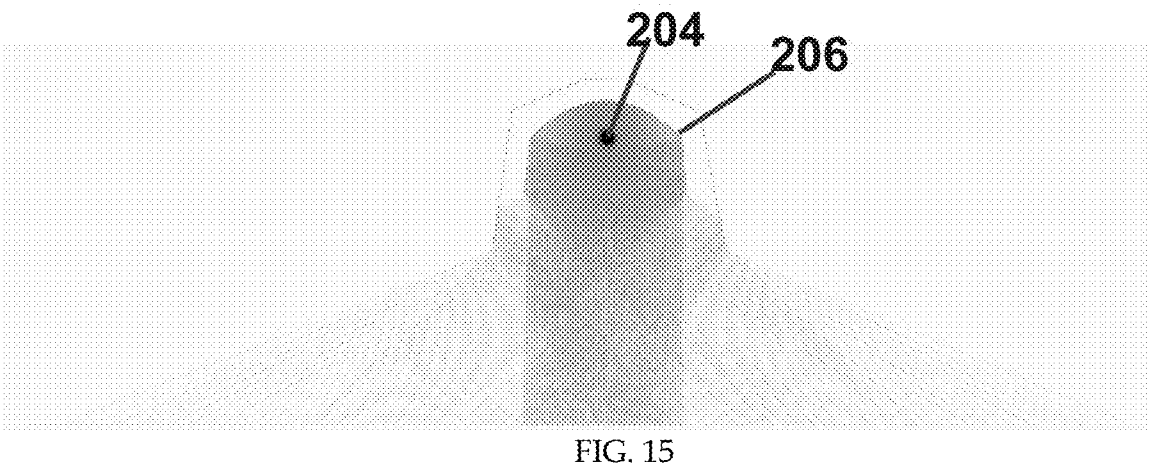

FIG. 15 shows a ray diagram of the reflective sheet of the second embodiment disclosed herein.

Figure 16:
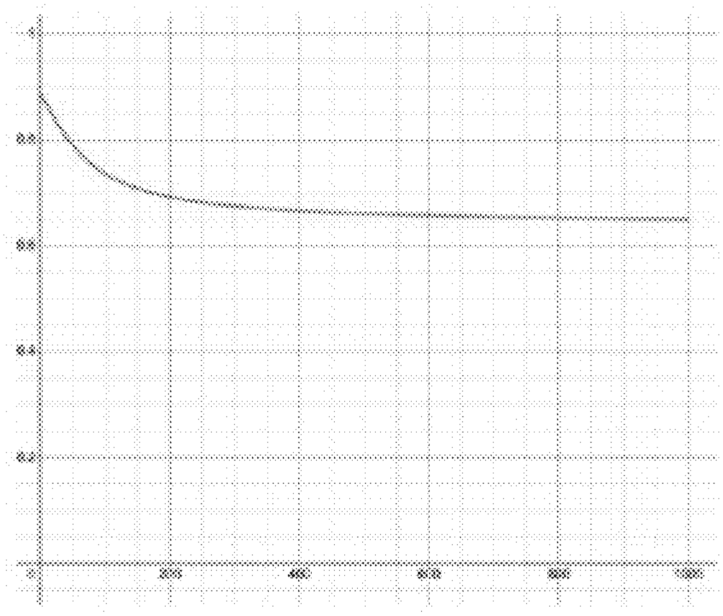

FIG. 16 shows a graph of radiant emission reaching the coverage area from the heat source as a function of height of the heat source off of the ground.

Figure 17A:
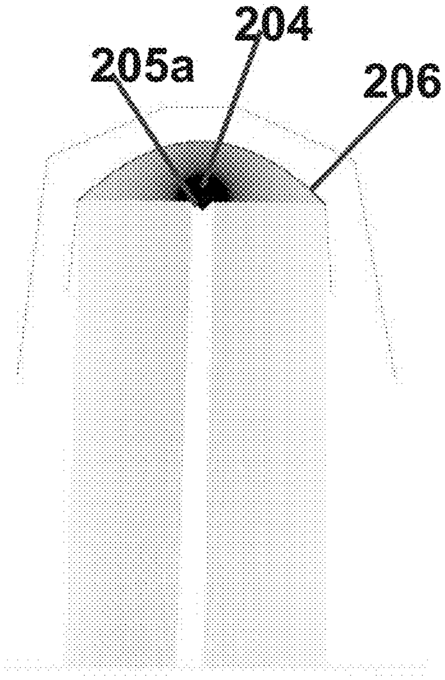

FIG. 17*a* is a reflective pattern for the heat shield of FIG. 14*b* with a bottom reflective sheet to block escaping rays beneath the heat source.

Figure 17B:
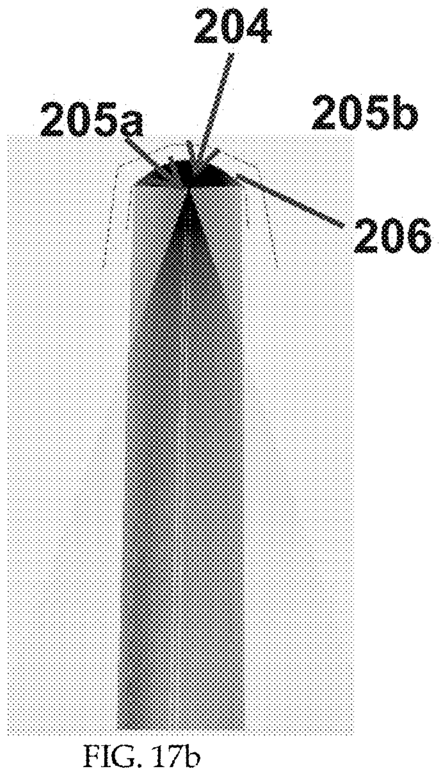

FIG. 17*b* is an alternative embodiment a reflective pattern for the heat shield of FIG. 14*b* with a bottom reflective sheet to block most escaping rays beneath the heat source while allowing through rays directly beneath the heat source.

Figure 7:
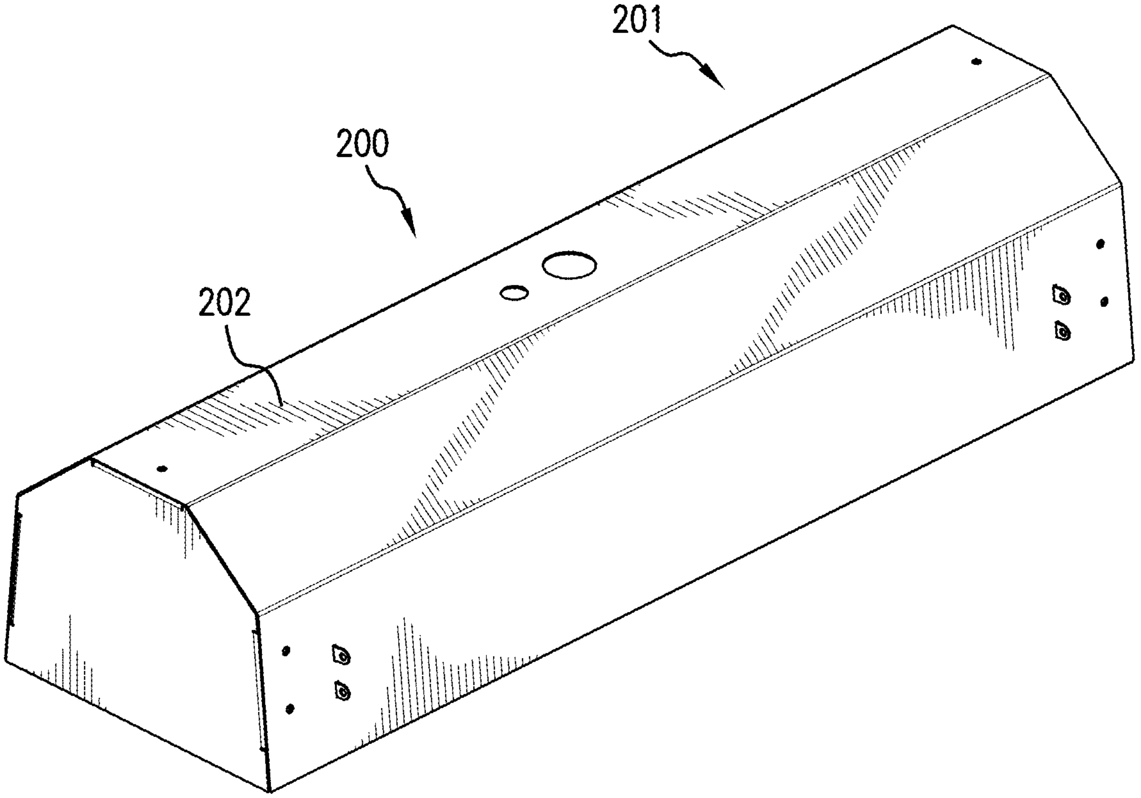
FIG. 7 is a front-side perspective view of a second embodiment of a heat lamp according to this disclosure.
Figure 8:
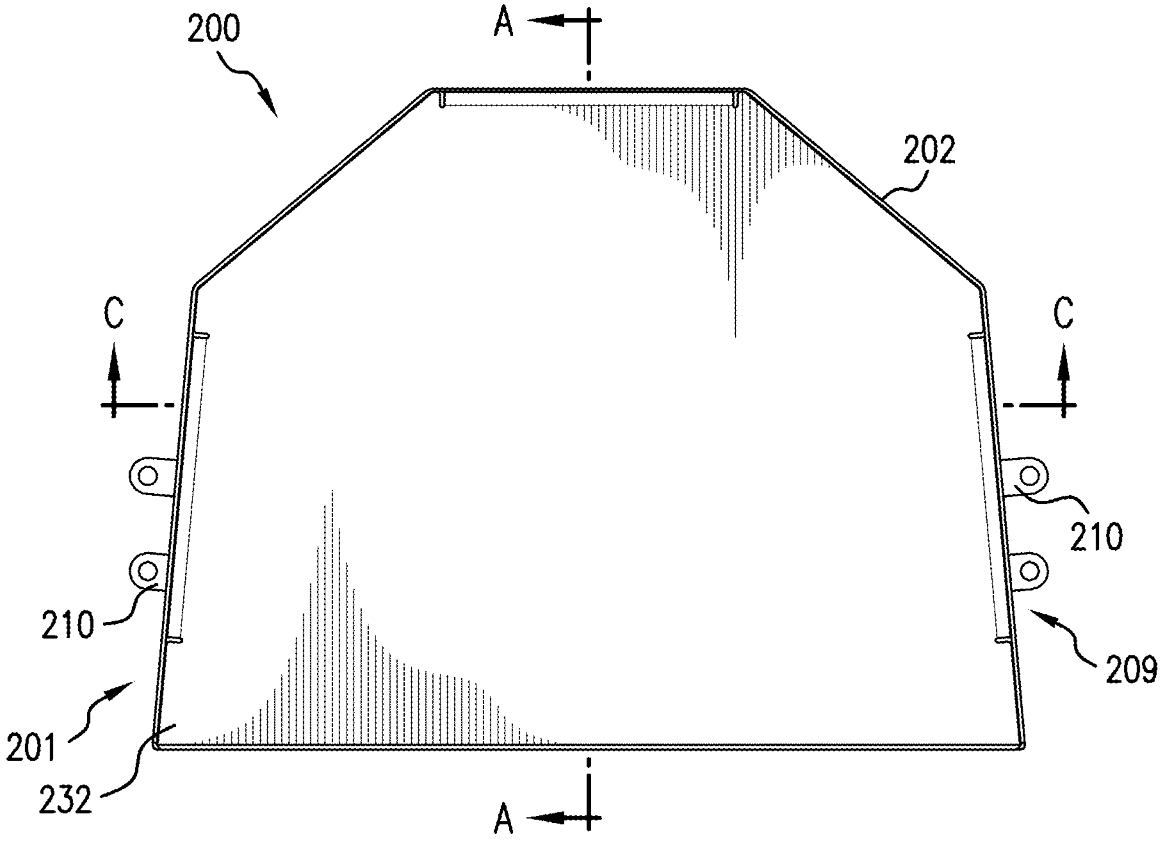
FIG. 8 is a left side view of the heat lamp of FIG. 7.
Figure 9:
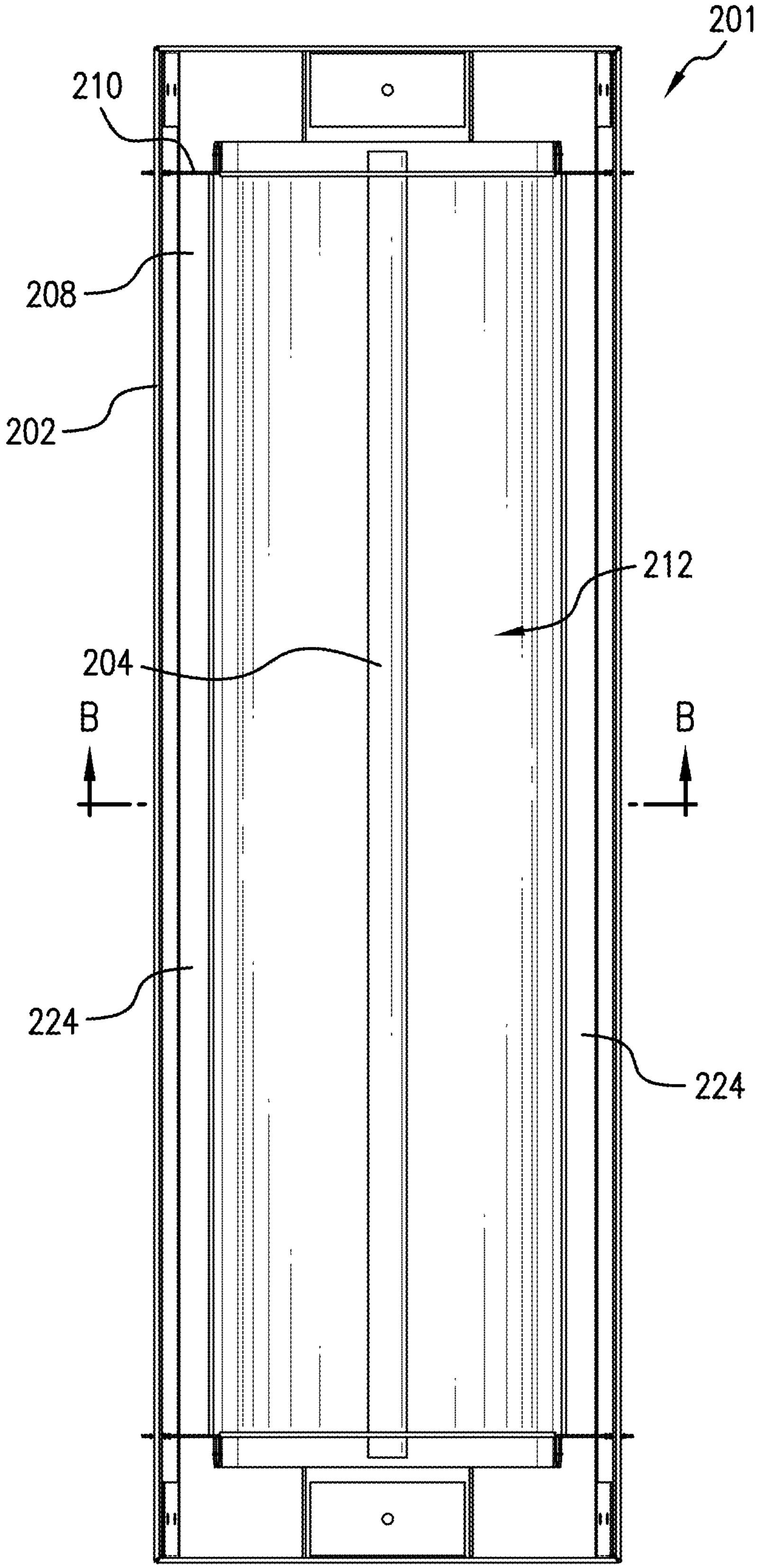
FIG. 9 is a bottom view of the heat lamp of FIG. 7.
Figure 18:
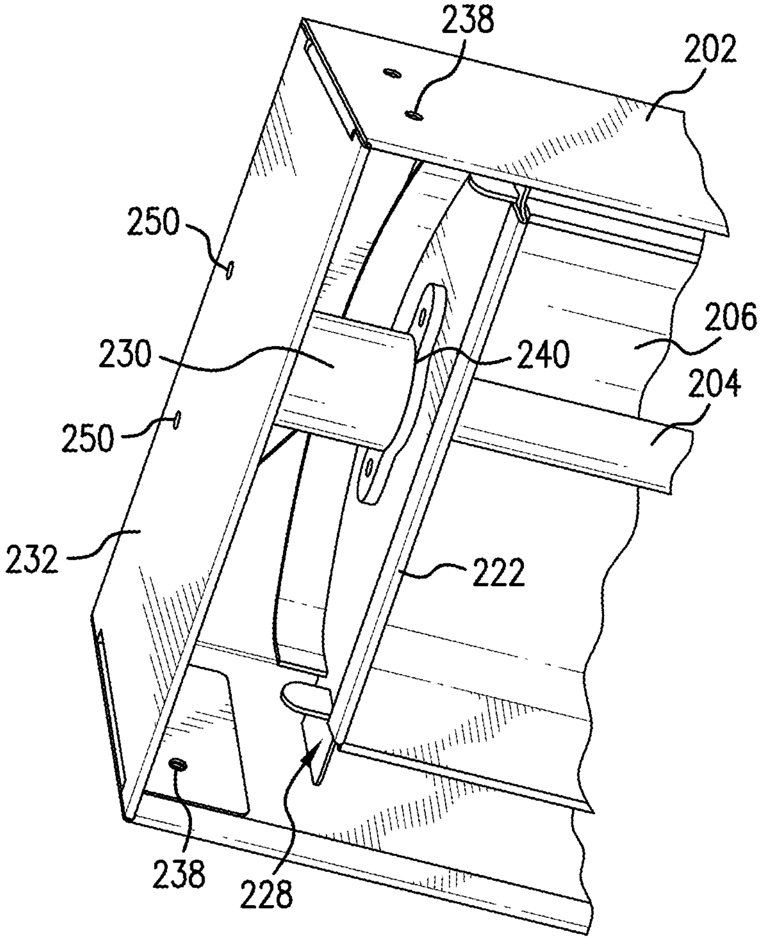

FIG. 18 is a perspective view of the heat lamp of FIG. 7 with an alternative way of connecting the outer sheet and reflective sheet.

Figure 19A:
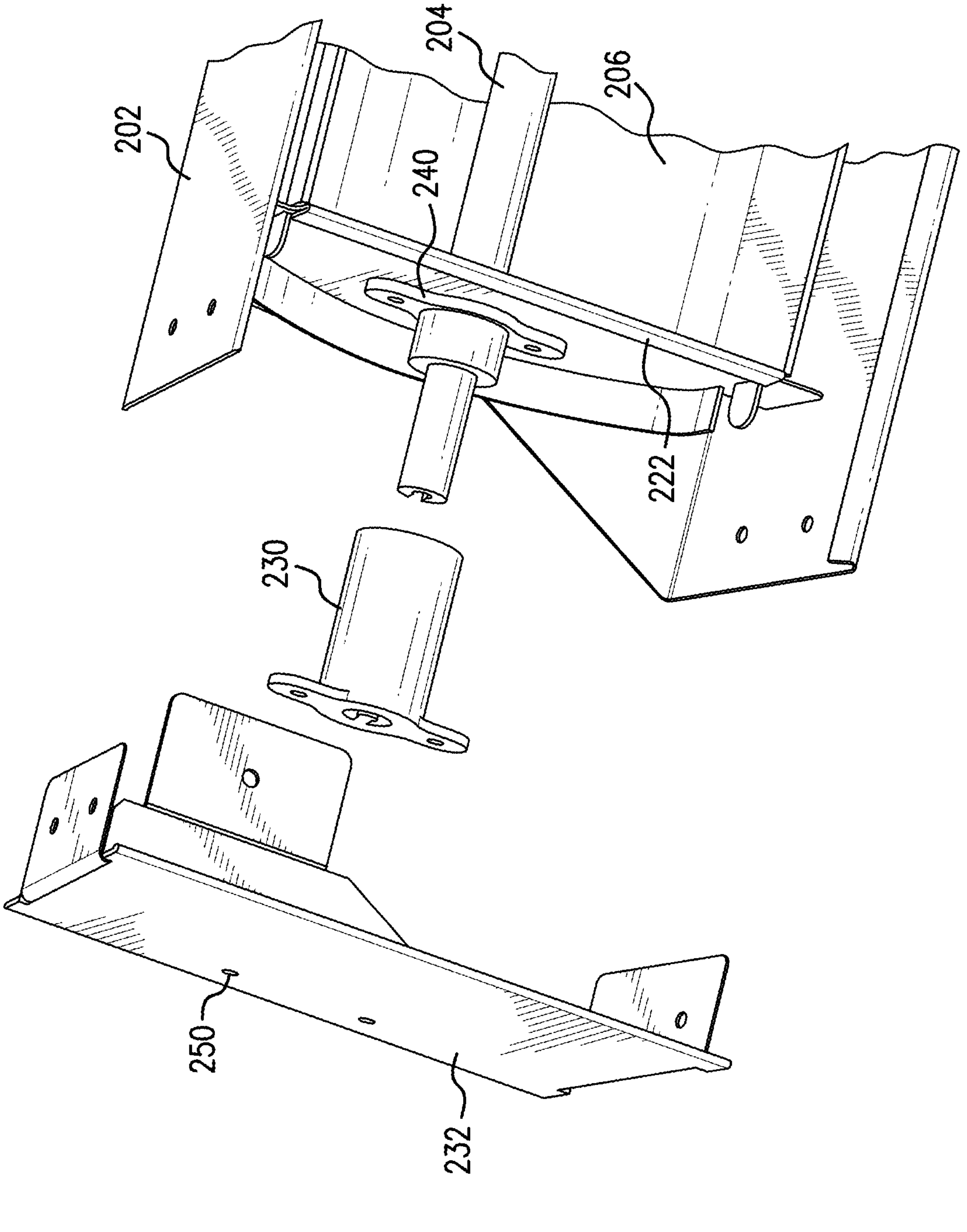

FIG. 19*a* is an exploded, bottom view of the heat lamp of FIG. 18.

Figure 19B:
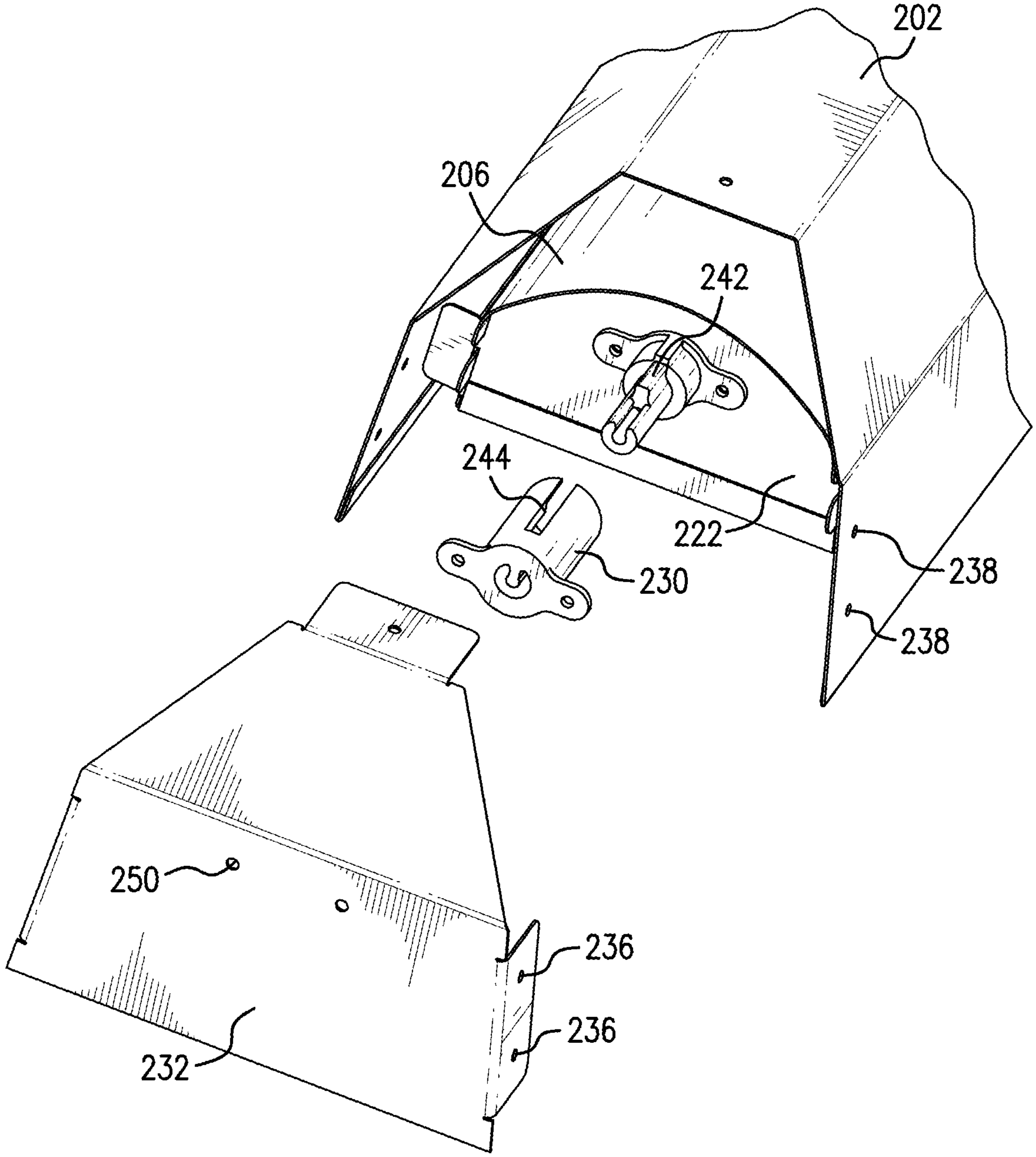

FIG. 19*b* is an exploded, top view of the heat lamp of FIG. 18.

DETAILED DESCRIPTION OF THE PREFERRED EMBODIMENTS

Figure 1:
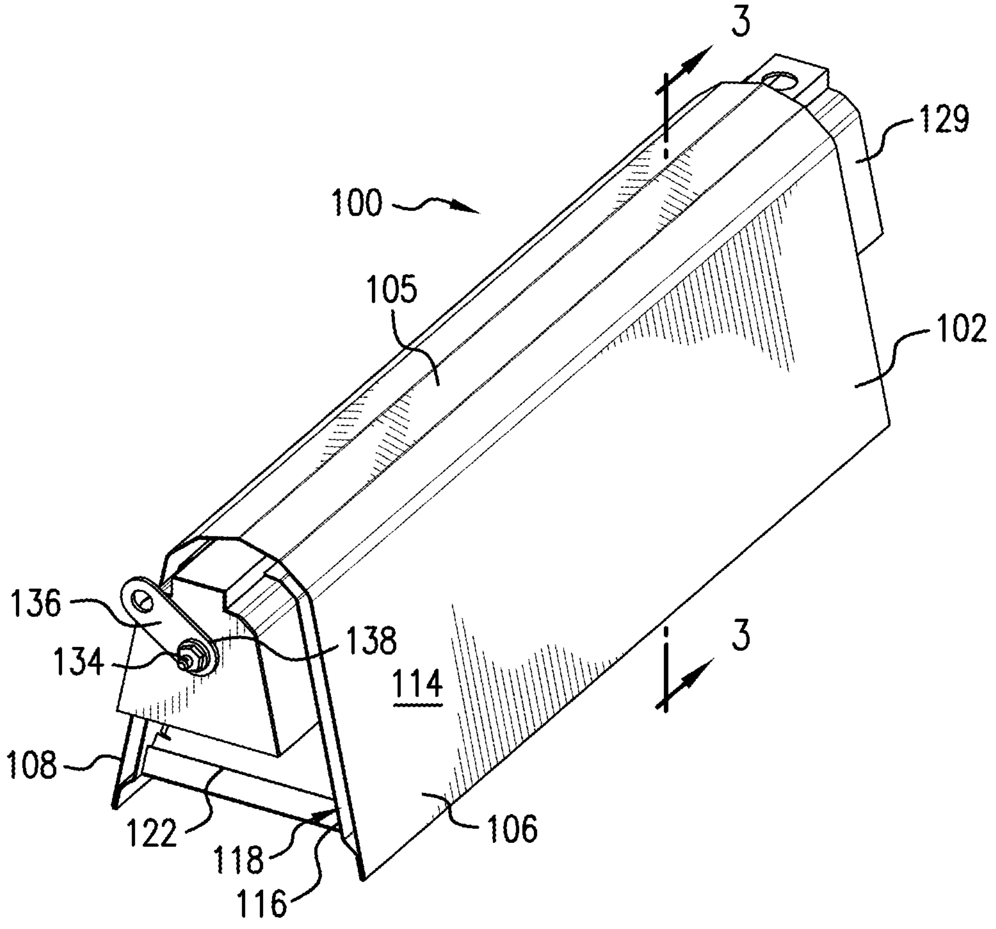
FIG. 1 is a front-side perspective view of a heat lamp according to this disclosure.
Figure 2:
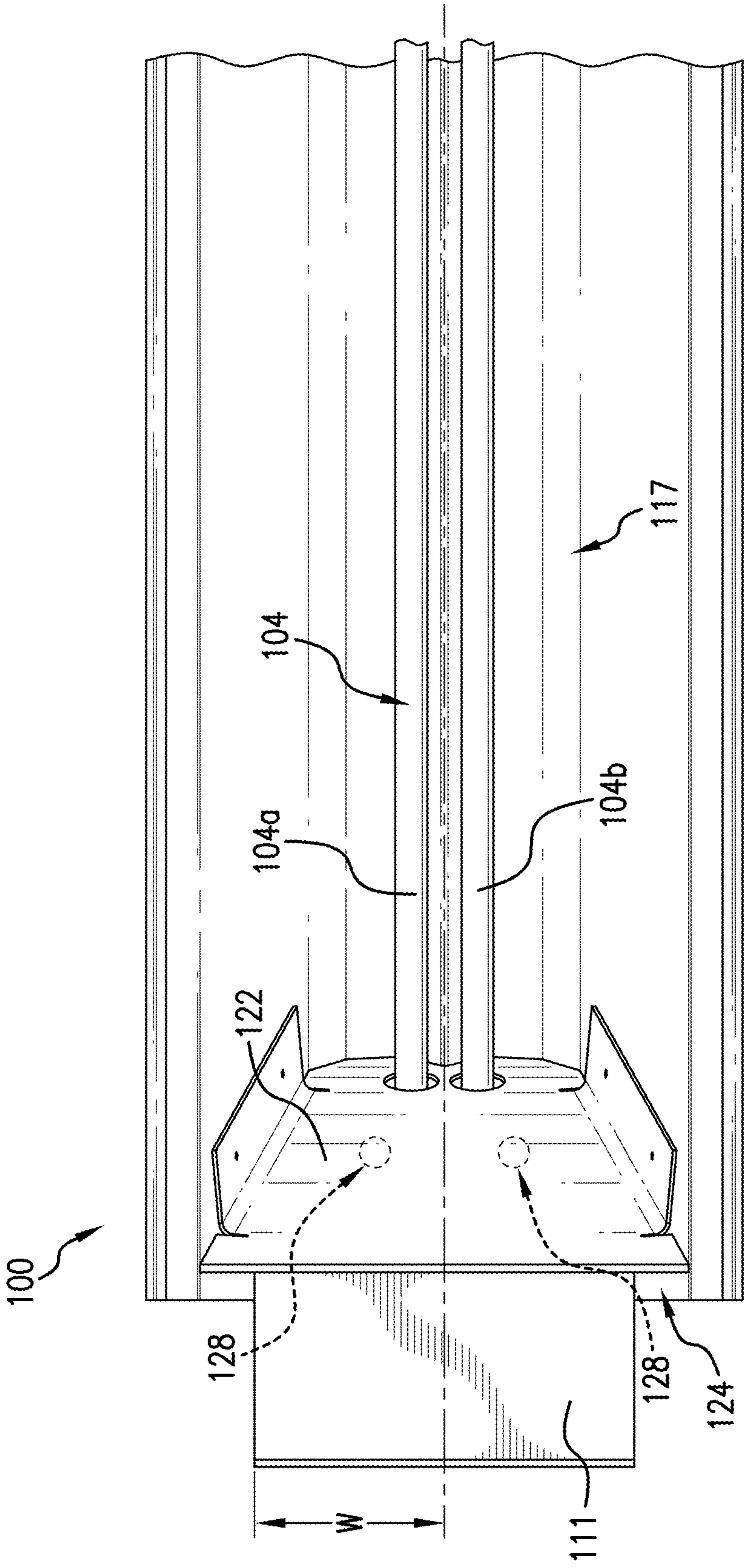
FIG. 2 is a bottom-side view of the heat lamp of FIG. 1.

Referring to FIGS. 1-2, shown is a heat lamp 100 according to this disclosure. Heat lamp 100 comprises a shroud 102 that is basically U-shaped or parabolic-shaped with bilateral symmetry along a longitudinal length greater than its width. This configuration encompasses at least one heat source 104 generally surrounded by shroud 102 to reflect heat downward out the opening of shroud 102.

In an embodiment, heat source 104 is a resistive infrared heating light. In the illustrated embodiment, heat source 104 is implemented as two resistive infrared heating lights 104*a*, 104*b* that extend the longitudinal length of shroud 102. Alternatively a single heating element or a single U-shaped heating light can be used for heat source 104. In fact, heat source 104 can be any type of infrared heating element known to those skilled in the art.

Principal features of heat source 104 can be dictated by design constraints. In embodiments used for warming newborn piglets, heat source 104 generally needs to raise the ambient temperature to about 95° F. over a relatively uniform area where the piglets lie. The desired heat source 104 also needs to operate at about 150 W with 120 VAC power. Therefore, to meet these design constraints, heat source 104 is preferably a radiative heating element that produces mostly infrared instead of visible light at a wavelength of 750 nm to 1 mm. In an embodiment, heat source 104 can be a tubular incoloy heating element 16 inches in length and 0.43 inches in diameter, operating at 100-160 watts (inclusive and any values in between) on 120 VAC. In another embodiment, the heating element is 16-48 inches long, inclusive, and any value in between. The impinging infrared radiation from heat source 104 readily transfers heat to the piglets. Heat source 104, however, is not sufficient by itself to provide the radiant heat necessary to warm the piglets. A shroud 102 comprising a reflective sheet 116 surrounded by an outer sheet 114 is specifically tuned to produce the needed heat of about 95° F. to the animals at the coverage area of the floor if hung at about 16 inches or 400 mm above the animals.

One of the innovations of this heat lamp is the use of a tubular heating element composed of high-performance materials such as AISI321, Incoloy, or SS304 stainless steel and the like, which are non-corrosive materials. These materials are specifically selected for their resistance to corrosion, thermal stress, and wear, ensuring durability even in harsh farm environments. The tubular design, with dimensions ranging from 14-18 inches in length and 0.35-0.45 inches in diameter, allows for a uniform emission of infrared radiation across the coverage area. This eliminates the 'hot spot' problem observed in prior art while delivering consistent heat. Additionally, the tubular shape and diameter select the surface area needed to emit the quantity of infrared radiation required for the animals, according to the Stefan-Boltzmann law, improving overall efficiency.

Heating animals efficiently and consistently requires balancing power consumption and radiation output. The heat source in this heat lamp is specifically engineered to operate in a power range of 100-160 watts. This range was determined based on extensive testing to maximize infrared radiation output while minimizing energy losses to conduction and convection. Unlike traditional high-wattage heat lamps, which emit excessive visible light and waste energy, this optimized power range ensures targeted, energy-efficient heating. The chosen wattage also reduces the risk of overheating and enhances the longevity of the heating element, making the lamp more reliable for extended use in farrowing operations and other agricultural settings. The radiant energy emitted at this wattage in this design has been shown to improve the health of piglets in a farrowing operation.

A reflective sheet 116 inside shroud 102 amplifies radiant heat from heat source 104 by reflecting infrared radiation downward toward the desired area. The shape of reflective sheet 116 also defines a volume of space 117 and, through conduction and convection, raises the temperature of air in the volume of space 117. The volume of hot air in volume of space 117 acts as a thermal blanket, limiting heat losses to the environment, keeping the heat source at a high enough temperature to encourage it to radiate infrared energy in its attempt to reach thermal equilibrium.

Shroud 102 comprises a top side 105, a left side 106, and a right side 108 that is bent with an opening 110 opposite top side 105 that can be oriented toward the desired area of interest for reflective light to reach the piglets. Shroud 102 can further comprise an outer sheet 114 and a reflective sheet 116 separated by an insulation gap 118. Insulation gap 118 can contain an insulation material or be air-filled to reduce heat loss of reflective sheet 116 by conduction, keeping outer sheet 114 relatively cool to the touch.

Figure 3:
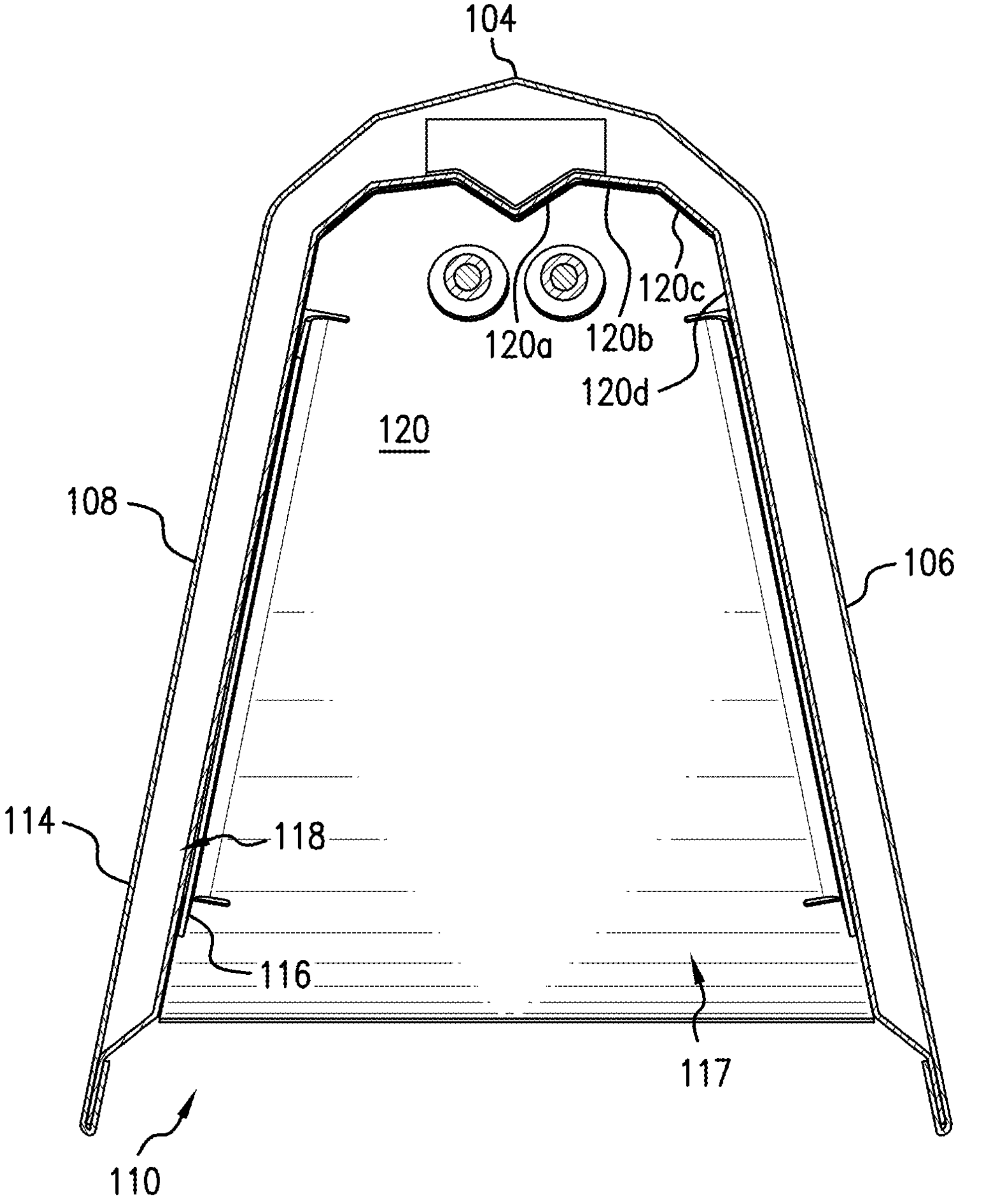
FIG. 3 is a side view of the shroud of FIG. 1.

Outer sheet 114 and reflective sheet 116 can be connected together to keep their relative positions fixed. In the illustrative embodiment shown in FIG. 3, the bottom of each left side 106 and right side 108 of outer sheet 114 is folded inward. The bottom of each left side and right side of reflective sheet 116 is inserted into this fold, and then outer sheet 114 and reflective sheet 116 are crimped together at the respective sides. Alternatively, shroud 102 can be formed of a single piece of sheet metal with or without inner sheet 116. Outer sheet 114 can be made of plastic since it doesn't overheat due to the design of reflective sheet 116 described below, or it can be made of metal, such as aluminum, which may be more durable. In other embodiments, as discussed below, outer sheet 114 and reflective sheet 116 can be loosely held together or fixed by heat-resistive fasteners or sealant to minimize heat conduction from reflective sheet 116 to outer sheet 114.

Reflective sheet 116 of shroud 102 can be a smooth, polished sheet of metal forming a heat reflective surface 120. Reflective sheet 116 may be made of any suitable reflecting material, e.g., stainless steel, such as acid proof stainless steel. In an embodiment, heat source 104 emits infrared radiation with a wavelength range of 750 nm to 1 mm. Much of the infrared radiation is directed downward from the bottom half of heat source 104. To maximize efficiency, heat reflective surfaces 120 reflect infrared radiation from the top hemisphere back down. Infrared light is reflected off heat reflective surfaces 120 relative to the angle of incidence from heat source 104. Heat reflective surfaces 120 are angled relative to each other to maximize the downward reflection of infrared light, improving efficiency by minimizing heating of shroud 102 and instead directing a maximum amount of infrared light downward toward the animal.

More specifically, reflective surfaces 120 are symmetrical about the longitudinal directional axis of shroud 102, with the heat source being positioned at the center, so each symmetrical half reflects a relatively equal amount of light rays downward. Light rays from the top half of heat source 104 reflect off heat reflective surfaces 120 relative to the angle of incidence; for example, a light ray from to top half of heat source 104 reflects off heat reflective surface 120*a* at an angle equal to its angle of incidence. This ray is then directed to heat reflective surface 120*d* where it is reflected again. Heat reflective surface 120 can have multiple surfaces angled with respect to each other, including surfaces 120*a*, 120*b*, 120*c*, and 120*d*, to maximize the downward reflection of light rays. Each of these heat reflective surfaces 120*a*-120*d* can be formed with obtuse angles with respect to each other, including any angle between ninety and one hundred thirty-five degrees, or any angle in between) with respect to each other. The goal is to maximize the downward reflection of light rays to the opening of shroud 102 and prevent reflections back to heat source 104, thereby preventing self-heating.

Furthermore, heat reflective surface 120 is sufficiently long to aim the light rays downward toward a specific area commensurate with where the piglets tend to lie relative to the sow. This allows the maximum amount of heat to the piglets who need it for growth without making the sow uncomfortably hot. Referring back to the description of heat source 104, a heating element 16 inches in length is sufficient to warm piglets laying in rectangular area of the same length and a width corresponding to the width of reflective surface 120.

At opposite ends of reflective sheet 116 inside the reflector, and at each longitudinal end, are positioned end reflectors 122. Each end reflector 122 can a plate inside the trough to reflect infrared light from heat source 104 downward. Each end reflector 122 can be positioned at an angle off perpendicular to maximize reflection.

Heat source 104 is positioned near the vertex of shroud 102 to maximize efficiency. By heating the air in volume of space 117 around heat source 104 through convection, the heated air will also radiate infrared. Thus, keeping heat source 104 close to the top and surrounding it with reflective surfaces 120 improves efficiency. The heated air is radiates downward out of volume of space 117 towards the area of interest by reflective surfaces 120. As a result, volume of space 117 created by the shape of reflective surface 120 amplifies the resultant heat applied to the piglets beyond the radiative infrared heat from heat source 104. In essence, volume of space 117 functions as a heat amplifier to heat source 104.

Figure 6:
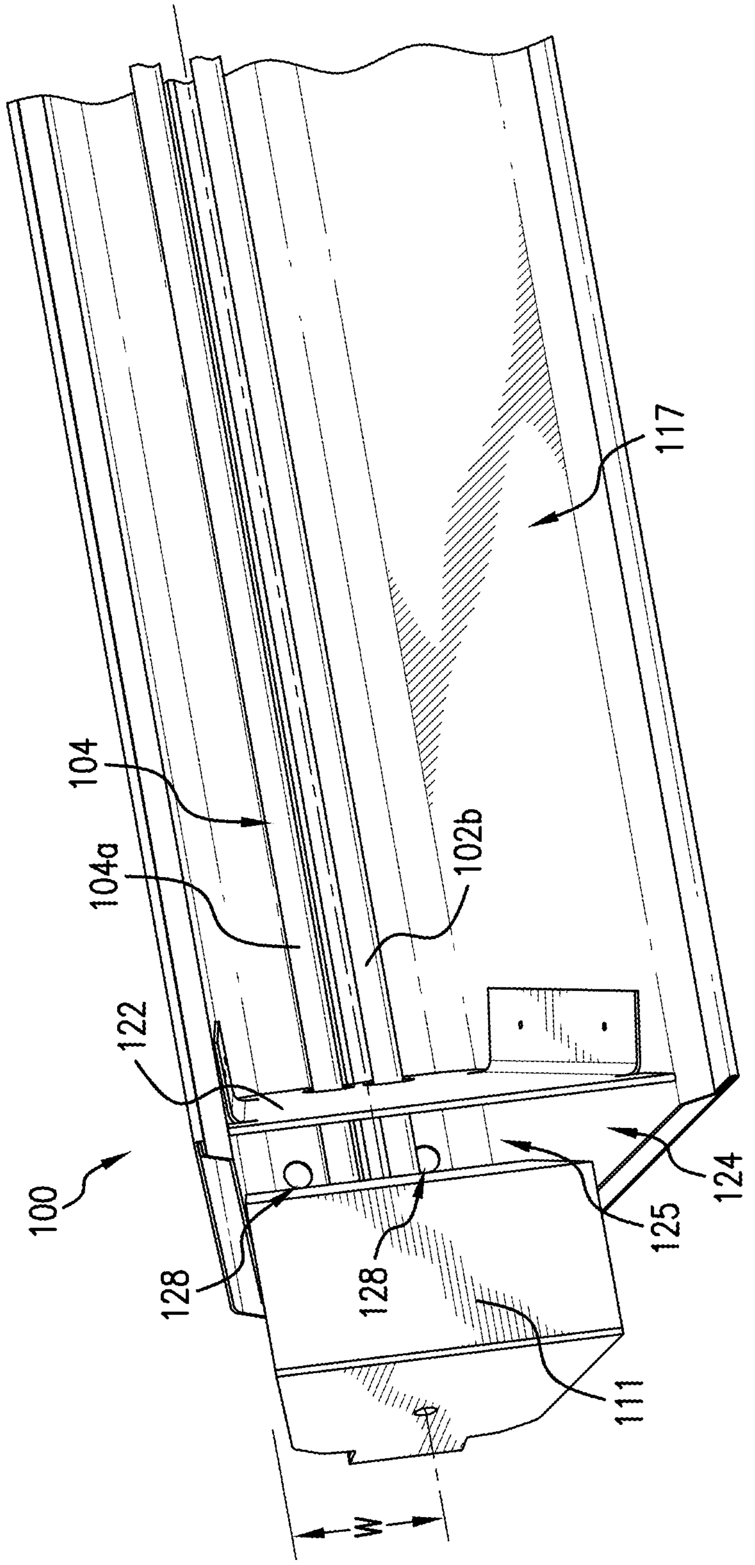
FIG. 6 is a bottom-side perspective view of the heat lamp of FIG. 1.

Some of the heat from heat source 104 will inherently transfer to the reflective sheet 116 and each end reflector 122 via conduction through the air between the element and reflective sheet 116. Over time, this transfer of heat will cause these surfaces to heat, potentially damaging or melting electrical housing 111. To keep shroud 102 cool and move heat away from electrical housing 111 and connection block 129 at the opposite end, an air circulation channel 124 can be provided. Referring to FIG. 6, end reflector 122 is positioned apart from electrical housing 111 with a space 125 in between. At least one communicative hole 128 (also shown in phantom in FIG. 2) in reflective sheet 116 between end reflector 122 and electrical housing 111 is provided. Communicative hole 128 is the entrance to the area between reflective sheet 116 and outer sheet 114, which, as can be seen in FIG. 1, is exposed to outside air. This creates air circulation channel 124 from space 125 into at least one communicative hole 128 and out an insulation gap 118, circulating air between end reflector 122 and electrical housing 111 to keep electrical housing 111 cool. Insulation gap 118 can be open to the air, filled with insulation, or comprise a combination of the two.

FIGS. 7-12 illustrate a second embodiment of a heat lamp 200 according to this disclosure. Heat lamp 200 comprises a shroud 201 and heat source 204. Shroud 201 comprises an outer sheet 202 and a reflective sheet 206 that is generally parabolic, defining a volume of space that functions as a heat amplifier, as described above, and directs radiant heat directly downward out of the opening, i.e. a first emission area 212.

In the second embodiment, outer sheet 202 and reflective sheet 206 are separated by an insulation gap 208 corresponding to the profile of reflective sheet 206, with openings 213 directed on opposite sides toward the area of interest. This simultaneously insulates outer sheet 202 from reflective sheet 206 to reduce heat loss from conduction, and directs air heated by convection inside insulation gap 208 out the openings 213 towards the area of interest. Thus, insulation gap 208 forms a second volume of space with an opening, i.e. a second emission area 211 that is open to the environment by openings 213. In addition to the air around heat source 204 being heated by conduction and radiating infrared downward toward the area of interest, a second volume of air in the second volume of space is also heated by conduction and radiates infrared downward out second emission area 211 toward the area of interest. In essence, first emission area 212 and second emission area 211 function as heat amplifiers to heat source 104. Like the first embodiment, insulation or a combination of insulation and air can be added in insulation gap 208 to reduce heat loss or adjust the heat amplification out of second emission area 211.

Outer sheet 202 is generally U-shaped with bilateral symmetry along a longitudinal length greater than its width. It can be formed from a single piece of material (e.g. aluminum or plastic) with hemmed edges for strength and to prevent cuts. The side ends are attached to each end of the sheet by rivets or welds to create a unitary structure for outer sheet 202.

Reflective sheet 206 has a parabolic shape to reflect heat from heat source 204 uniformly downward in the same manner as described above. It too can be formed from a single piece of reflective material with hemmed edges for strength and to prevent cuts. The parabolic shape of reflective sheet 206 can be determined mathematically according to the quadratic equation defining a parabola (y=ax^2). The magnitude of the coefficient "|a|" in the quadratic equation for the parabola y=ax^2 determines the steepness or width of the parabola. As "a" becomes smaller, the parabola becomes wider or flatter, whereas as "a" becomes larger the parabola becomes narrower or steeper. As a smooth parabola, reflective sheet 206 has a continuous curvature through a vertex of the parabolic sheet. Angled surfaces or discontinuous surfaces at or around the vertex, as shown in the first embodiment of FIG. 1 are not necessary to distribute heat from the vertex or prevent redirection of heat back to heat source 204.

The optimum configuration of reflective sheet can be based on, the following: (1) a parabolic shaped reflective sheet 206; (2) the heat source 204 being centered at the focus of the parabola defining reflective sheet 206; and (3) the aspect ratio defined as the ratio of the focal length (the distance between the focus and the vertex) and the length of the *latus* rectum (i.e., the side-to-side width across the parabola at the focal point). As the aspect ratio is increased, the reflective beam is more concentrated, whereas a lower aspect ratio provides broader coverage area. The reflective sheet 206 of the illustrated embodiment can be described by the formula (y=−0.25x^2) to provide an aspect ratio tuned to provide substantially consistent coverage beneath the parabola defining reflective sheet 206.

Figure 14C:
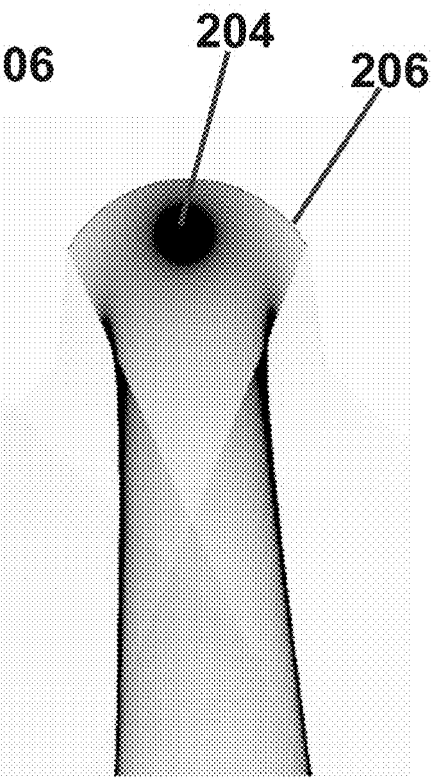

With a magnitude greater than −0.25 or a larger aspect ratio, as shown in FIG. 14*a*, the heating pattern appears more like a laser with a high concentration about the major axis and a sharp decrease the further out from the major axis. This is not preferred because the design create a narrow high intensity area of heat. FIG. 14*c* shows an example of an arc-shaped reflector with the heating element at the center. This orientation creates areas of high intensity heat at the outer edges. This is not preferred because of the uneven heating distribution.

The illustrated embodiment for reflective sheet 206 is shown in FIG. 14*b*. In this configuration, the focus length of the parabola is 1 inch or 25.4 mm (i.e., the distance from the focus to the vertex) with the *latus* rectum being 4 inches or 101.6 mm resulting in the aspect ratio equaling 1/4 or 0.25. The center of heating source 204 is located at or substantially near the focal point of the parabola to produce a substantially constant heating pattern with little gradient beneath reflective sheet 206. As the aspect ratio is increased, the reflective beam is more concentrated where as a lower aspect ratio provides broader coverage area. In this regard, the aspect ratio is substantially equal to 1/4. One skilled in the art will understand small variations may be permitted. But, as the aspect ratio is decreased, for example to 1/8, so that the *latus* rectum gets wider, the rays begin to disperse in a wider direction. Conversely, as the aspect ratio is increased, for example to 1/3, the rays begin to get more heavily concentrated towards a beam.

FIG. 15 shows the ray pattern off of heat source 204. As can be seen, there's a heat density directly beneath reflective sheet 206 and stray rays outward. This is illustrative of the infrared heat signature of the heat lamp 200 according to this disclosure shown in FIG. 13 where the majority of the heating is directly beneath heat lamp 200 and quickly cooling outward. These stray rays can be quantified with respect to a total 360 degree emission area of heat lamp 200 by assuming rays from a 40 degree area represented from perpendicular to the major axis and downward are lost. Another 50 degrees of the area measured from each side of the major axis is potentially lost based on the height off the ground according to the formula $\Theta=\tan^{-1}(W/2/H)$ where W is the width shroud 201 and H is the height of heat source 204 off the ground. This means that the total emissions from heat source 204 making to the ground can be determined by the formula:

$$360-40-40-50+\tan^{-1}(W/2/H)$$

FIG. 16 shows a plot of the above formula with degrees on the y-axis and height off the ground in mm on the x-axis. It can be seen that between 0-400 mm off the ground, there's an increasing escapage of heat but around, 400 mm off the ground, the graph levels off so that the amount energy coming out of heat source 204 towards the area of coverage is about sixty five percent (65%) of the total emissions of heat source 204. This means that at about a height off of the ground of 400 mm and above, the amount energy coming out of heat source 204 towards the area of coverage is about sixty five percent (65%) of the total emissions of heat source 204 where 65% of the energy from the heat source is in an area corresponding to the side-to-side width of reflective sheet 206.

Even with a parabolic shaped reflective sheet 206, rays coming from the bottom side of heating source 204 will radiate outward, not necessarily straight down because they are not reflected downward by the parabolic shape of reflective sheet 206. In an embodiment, it is possible to place a bottom reflective sheet 205 beneath heating source 204 to reflect rays up to reflective sheet 206 for redirection straight down, as shown in FIG. 17*a*. This will nearly eliminate any stray angularly oriented rays outside the desired area of coverage. This configuration can be modified further, as shown in FIG. 17*b*, with two bottom reflective sheets 205*a*, 205*b* on either side of directly beneath heating source 204. This allows rays directly beneath heating source 204 to go straight down while redirecting angularly oriented rays back up to reflective sheet 206. Bottom reflective sheets 205, 205*a*, 205*b* can be connected to end reflectors 222 in the same matter with male female connections or with fasteners as described below in the context of connecting reflective sheet 206 to end reflectors 222.

At opposite ends of reflective sheet 206 inside shroud 201 and at each longitudinal end are positioned an end reflector 222. Each end reflector 222 can be a plate inside the trough to reflect infrared light from heat source 204 downward. Each end reflector 222 can be positioned at an angle off perpendicular to adjust reflection towards the coverage area. In one embodiment, each end reflector 222 has tabs 210 that extend into corresponding slots 215 in outer sheet 202 to minimize conduction of heat from reflective sheet 206 to outer sheet 202. Reflective sheet 206 also further includes tabs 217 on respective ends thereof, and end reflector 222 includes corresponding slots 219 to receive tabs 217 of reflective sheet 206, combining reflective sheet 206 to each end reflector 222 while minimizing conduction of heat from reflective sheet 206 to each end reflector 222. The respective tabs 210 and tabs 217 are not fixed but rather float inside the respective slots 215 and slots 219, reducing heat transfer and keeping the exterior of heat lamp 200 safe to touch. Tabs 210 and tabs 217 can also be configured as heat-resistant fasteners.

In an alternative embodiment, shown in FIGS. 18, 19*a*, 19*b*, reflective sheet 206 and each end reflector 222 are connected together with a male/female connecting arrangement. In one example, one or more tabs 226 on one of reflective sheet 206 or end reflector 222 and corresponding slots 228 on the other are fitted together and then the tabs turned to provide a mechanical lock To provide a heat loss separation between reflective sheet 206, end reflectors 222 and outer sheet 202 an insulating standoff 230 is provided between and attaching each end reflector 222 and each side wall 233 on the ends of outer sheet 202. A reinforcement member 240 is attached around a through hole on each end reflector 222 through which heat source 204 extends. A couple of raised, laterally spaced mount points 242 are positioned to receive insulating standoff 230, which has corresponding grooves 244 to receive these mount points 242, providing a floating connection The other end of insulating standoff 230 has a tab 246 with receiving holes 248 therein to align with corresponding receiving holes 250 on side wall 232 to allow the two pieces to be fastened together. Each side wall 232 has protruding portions 234 with receiving holes 236 that align with corresponding receiving holes 238 on outer sheet 202 to fastening, for example with rivets. Thus, reflective sheet 206, end reflectors 222 and outer sheet 202 are separated by insulating standoff 230 so that there is no metal-to-metal contact between reflective sheet 206, end reflectors 222 and outer sheet 202, preventing conduction of heat from reflective sheet 206, end reflectors 222 to outer sheet 202. This increases the efficiency of heat lamp 200 and keeps outer sheet 202 and side walls 233 safe to touch.

Returning to FIG. 10, each end reflector 222 also comprises a receiving hole 221 with at least two nubs 223, preferably three nubs 223, projecting into the receiving hole 221 for an effective diameter slightly less than that of heat source 204. This minimizes conduction of heat from heat source 204 to end reflector 222, which in turn minimizes conduction of heat to reflective sheet 206 and outer sheet 202. These nubs provide durable structural support for the heat source while limiting surface contact and therefore heat conductivity from the heat source to the support structure.

Like the first embodiment, heat source 204 comprises a resistive infrared heating light that extends the longitudinal length of shroud 201. While only one heat source 204 is shown, as in the first embodiment, multiple heat sources or different shapes of heat sources can be used. The electrical connections from the AC power cord to the electrical circuit elements can be located in the area between outer sheet 202 and reflective sheet 206. The electrical connections can also be located in a housing on top of outer sheet 202.

Figure 5:
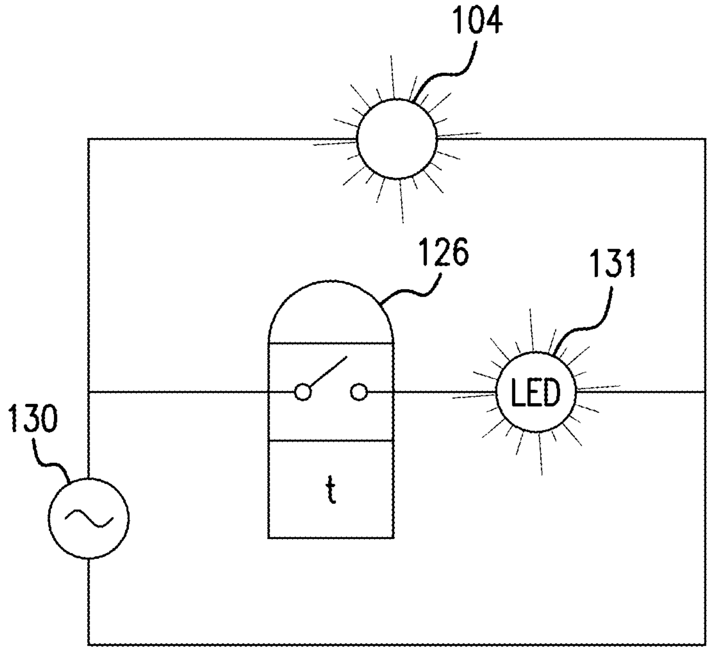
FIG. 5 is an electrical schematic for powering the heat lamp of FIG. 1.
Figure 10:
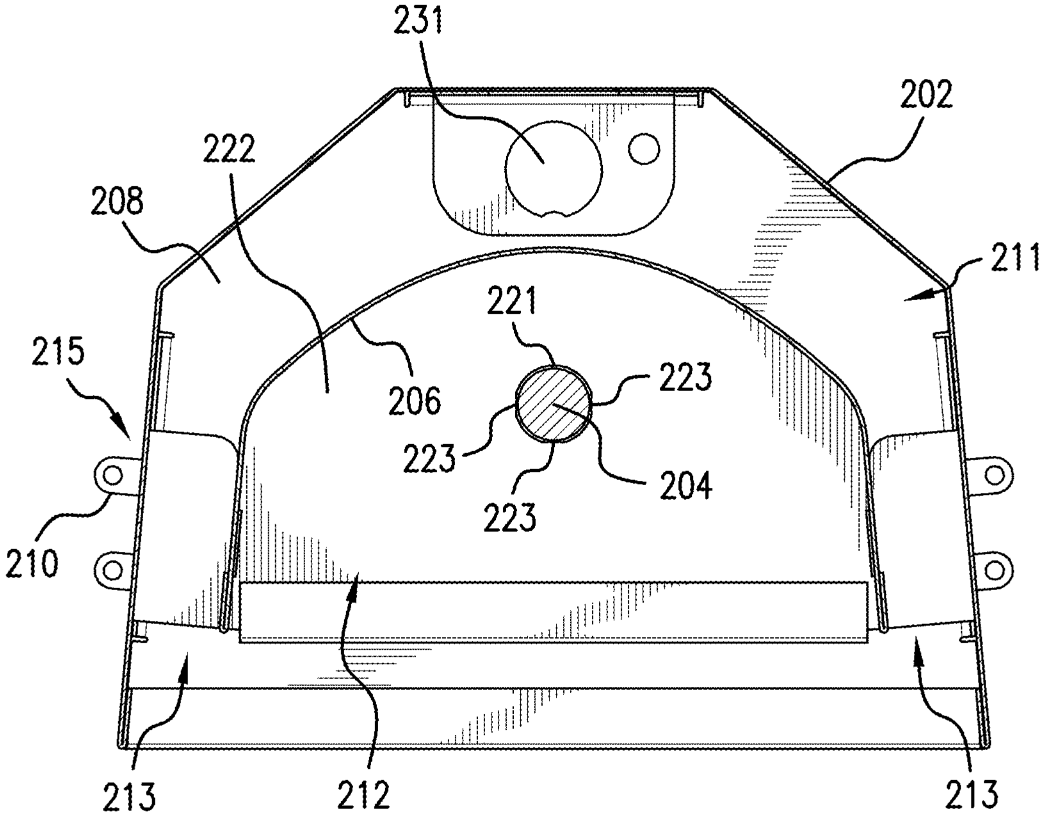
FIG. 10 is a sectional view taken along the line B-B of FIG. 9.
Figure 11:
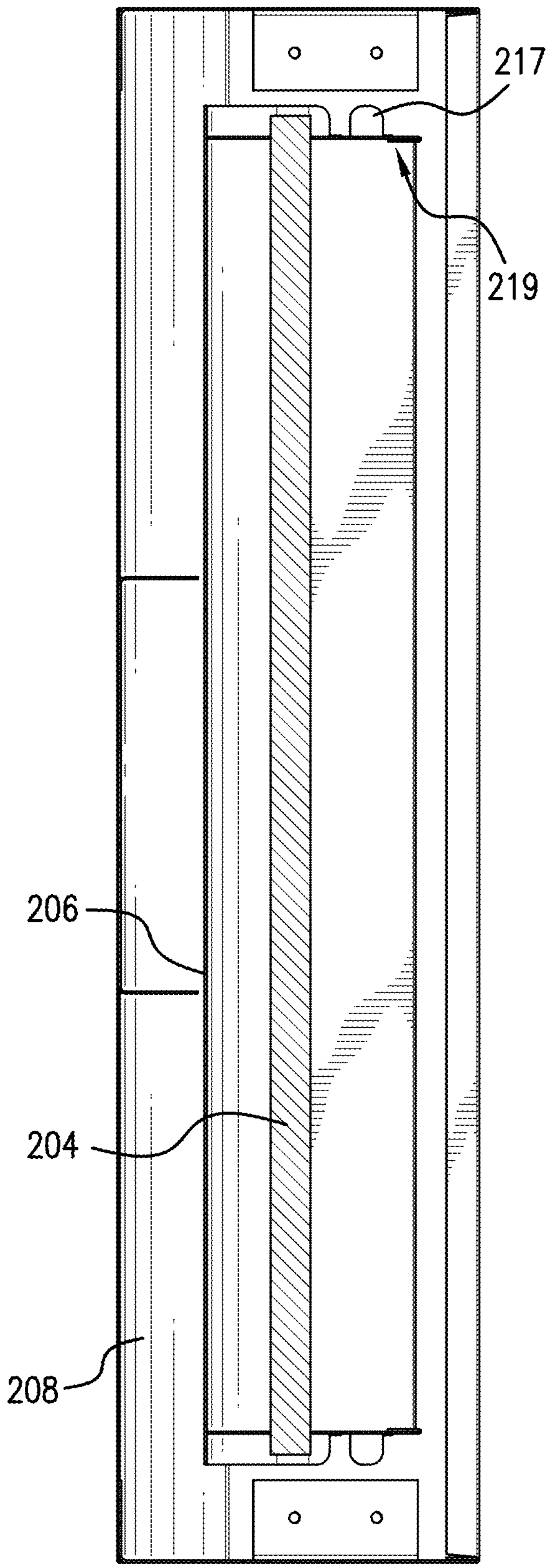
FIG. 11 is a sectional view taken along the line A-A of FIG. 8.
Figure 12:
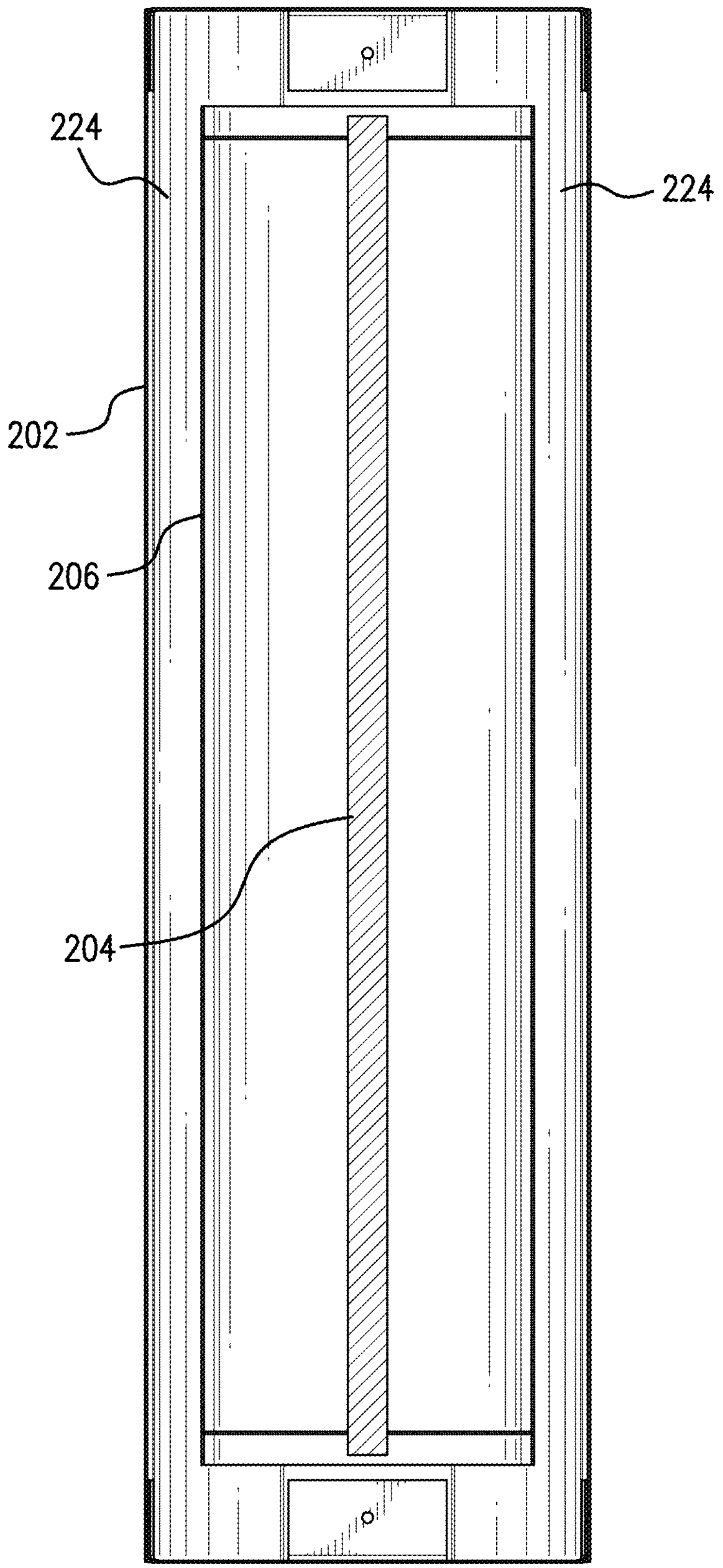
FIG. 12 is a sectional view taken along the line C-C of FIG. 8.

Turning to FIG. 10, which shows a cross-sectional view, the power cord comes in through the top in a sealable coupling 220 and electrically connects to heat source 204 and an indicator light 231 in a manner similar to that shown in FIG. 5 for the first embodiment. In this embodiment, however, indicator light 231 is positioned between outer sheet 202 and reflective sheet 206 of shroud 201, reflecting downward and out a bottom 224. This creates a lighted area surrounding the reflected light from heat source 204 to provide a visual indication of the boundary area for the heating area as well as lighting. In an embodiment, independent control wires for heat source 204 and indicator light 231 can be provided so that indicator light 231 can be operated independently from heat source 204, allowing an operator to turn off indicator light 231 during the day when ambient lighting is already high, for example.

Heat source 104 or heat source 204 can be powered according to the circuit shown in FIG. 5, discussed in more detail below. With reference to the first embodiment of FIGS. 1-6, the electrical connections from the AC power cord to the electrical circuit elements can be enclosed in an electrical housing 111. Electrical housing 111 can be formed of any non-corrosive, non-heat conductive material, including, but not limited to, plastic. To prevent electrical housing 111 from being damaged by the heat from heat source 104, shroud 102 is specially designed to channel heat away. With reference to the second embodiment of FIGS. 7-12, the electrical connections for heat source 204 extend from the AC power cord to the electrical circuit elements located in the area between outer sheet 202 and reflective sheet 206. In the embodiment shown in FIGS. 18, 19, the AC power cord can extend from heat source 204 out grooves 244 of insulating standoff 230 and then run between outer shell 202 and reflective sheet 206.

Returning to FIG. 5, which shows the electrical schematic, heat source 104 is connected to an AC source 130. Typically, this is done with a three-prong plug attached to a power cord with the end leads connected to heat source 104 and the ground lead to shroud 102, with connection points inside electrical housing 111. A switch in series between AC source 130 and heat source 104 can be provided near heat lamp 100 to facilitate easy on/off, or it can be omitted, with heat lamp 100 being simply plugged in and unplugged. The same circuit can be used for the second embodiment.

In an embodiment, a normally open electrical thermostat 126 is electrically connected in parallel with heat source 104 and in series with an indicator light 131. In operation, heat source 104 is turned on immediately when powered by AC source 130. Once the temperature rises to a threshold level set by thermostat 126, thermostat 126 closes and provides power to indicator light 131, signifying that heat lamp 100 is operational. A normally closed thermostat can be positioned in series between AC source 130 and heat source 104 set at a high threshold level to turn heat source 104 off if heat lamp 100 reaches a certain temperature, providing additional protection to prevent electrical housing 111 from melting or otherwise being damaged.

Safety considerations are paramount in the design of heat lamp 100, 200, particularly given its use in environments where humans and animals interact closely. To address this, heat lamp 100 and 200 are equipped with thermal management features that maintain the outer sheet's temperature below a safe threshold, even during prolonged operation. This is achieved via a thermostat which disables the heater when a determined temperature threshold is crossed. These features protect users from burns and reduce the risk of accidental damage to the lamp or surrounding materials. Furthermore, the heat lamp's design mitigates the potential for overheating, contributing to both user confidence and compliance with safety standards.

Figure 4:
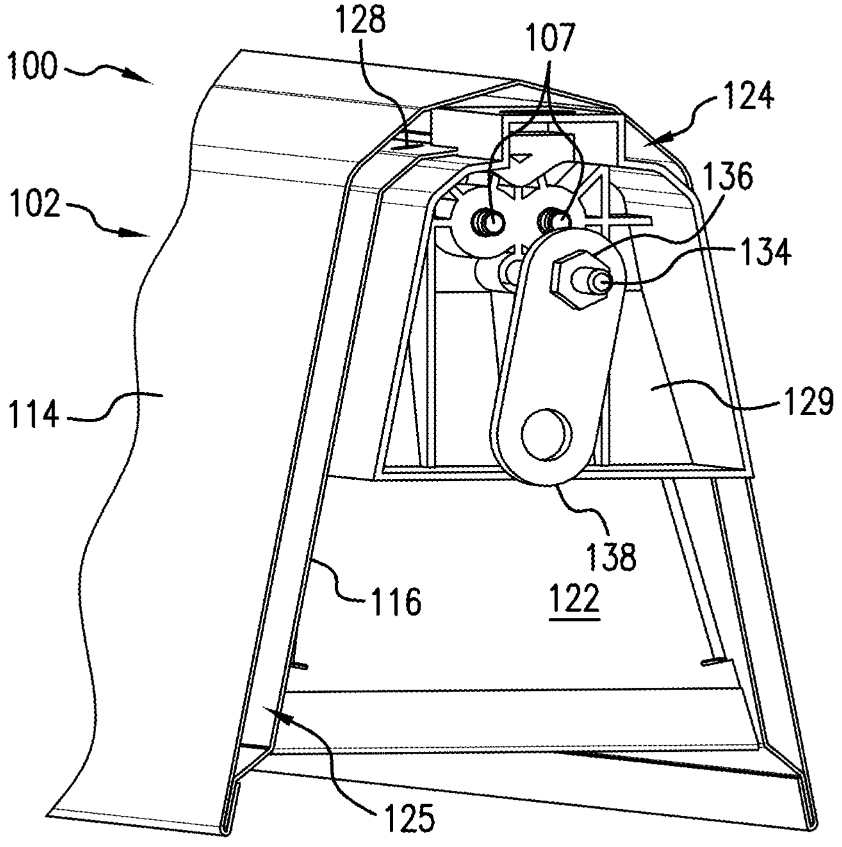
FIG. 4 is a side-view of the heat lamp of FIG. 1.

Turning to FIG. 4, a side view of heat lamp 100 is shown illustrating the position of thermostat 126. The leads to thermostat 126 are connected to AC source 130 and indicator light 131 inside electrical housing 111. The outside of thermostat 126 is positioned in insulation gap 118 between reflective sheet 116 and outer sheet 114 of shroud 102 to accurately measure the temperature near electrical housing 111. In the second embodiment, thermostat 126 and the other circuit elements are located in the area between outer sheet 202 and reflective sheet 206.

Returning to FIG. 1, heat lamp 100 can also be configured at opposite longitudinal ends with a tension hanger 134. Tension hanger 134 is a shaft that extends end to end to hold electrical housing 111 at one end and connection block 129 at the other end together. Tension hanger 134 can be implemented as a rod with threads at each end with a spring washer to create the tension and a locking nut 138 to secure each end. Turning to FIG. 4, connection block 129 is shown with tension hanger 134 extending out its end so that when tightened, connection block 129 and electrical housing 111 are pulled together tightly. Threaded ends 107 of the two resistive infrared heating elements 104*a*, 104*b* can be seen protruding from connection block 129 to hold these tight in shroud 102.

Shroud 102 can be oriented in any direction by a hook plate 136 that is positioned on the shaft of tension hanger 134 and is rotatable with respect to it. Hook plate 136 is selectively fixed in position by manually tightening a locking nut 138 that fixes the relative position of hook plate 136 to shroud 102. In this regard, hook plate 136 is selectively fixable relative to shroud 102, allowing the angle of shroud 102 and heat source 104 to be varied. This allows heat lamp 100 to be hung from the ceiling and tilted to any particular orientation for maximum direction of heat towards the piglets. In the second embodiment, the shroud 201 can be balanced by the location of the AC power cord being in the center of shroud 201. The AC power cord comes in through the top in the sealable coupling 220 which secures itself to the AC power cord.

Figure 13:
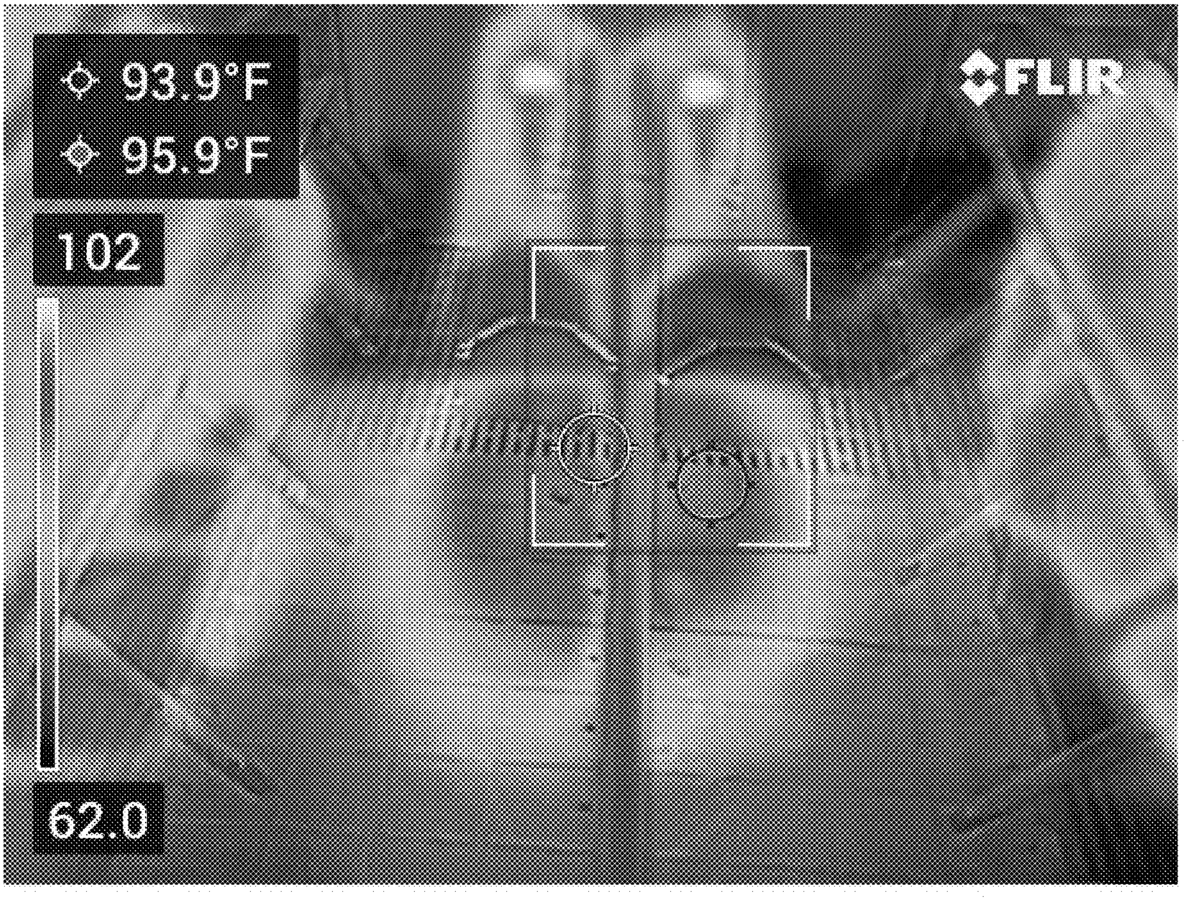
FIG. 13 shows two uniform heat patterns under two heat lamps according to this disclosure performant in a farrowing facility.

Referring to FIG. 13, shown is a thermal image of the coverage area on the floor below heat lamp 200 according to this disclosure. It can be seen that the heat is directed straight down from heat lamp 200 and does not radiate out towards the sow. This means that the piglets, for example, will be drawn to the heated area away from the sow to minimize accidental layons. Unlike prior art heat lamps that create a penumbra that increases and decreases in size as the heat lamp is moved, heat lamp 200 directs radiant heat directly downward out of the emission areas, so that the total meaningful emission area is substantially equal to the coverage area of heat lamp 200 irrespective of a height of the heat lamp from the floor. This is necessary to keep the coverage area away from the sow to prevent layons.

The foregoing discloses a heat lamp that incorporates infrared tubular heat sources engineered to operate between 100 and 160 watts. At this relatively low power level, the heat lamps emit the required radiation to warm the animals and limits energy losses due to convection and conduction. It does so without the use of glass sealing to shield the heat source from drafts and air currents that would otherwise reduce its efficiency, instead employing a uniquely shaped reflective surface to create one or more volumes of spaces functioning as heat amplifiers.

While the principles of the invention have been described herein, it is to be understood by those skilled in the art that this description is made only by way of example and not as a limitation on the scope of the invention. Other embodiments are contemplated within the scope of the present invention, in addition to the exemplary embodiments shown and described. Modifications and substitutions by one of ordinary skill in the art are considered to be within the scope of the present invention, which is not to be limited except by the following claims.

I claim:

1. A heat lamp for heating a coverage area on a floor, the heat lamp comprising:
- a heat source that emits infrared radiation; and
- a parabolic reflective sheet with an aspect ratio of 1/4, wherein the heat source is centered at a focus of the parabolic reflective sheet to provide a substantially consistent temperature in an area on the floor directly beneath the parabolic reflective sheet;
- an outer sheet surrounding the reflective sheet with an insulation gap between the outer sheet and the reflective sheet; and
- an indicator light connected in parallel to the heat source to provide a visual indication of a total emission area.

2. The heat lamp of claim 1, wherein substantially sixty-five percent (65%) of the energy from the heat source is directed downward to the floor in an area corresponding to a width of the parabolic reflective sheet when the heat source is positioned four-hundred millimeters (400 mm) off the floor.

3. The heat lamp of claim 1, and further comprising an outer sheet surrounding the reflective sheet with an insulation gap between the outer sheet and the reflective sheet.

4. The heat lamp of claim 3, and further comprising:
- a first emission area beneath the parabolic reflective sheet tuned to direct infrared energy directly downward;
- a second emission area directed downward out of the insulation gap; and
- a total emission area of the heat lamp comprising the first emission area and the second emission area.

5. The heat lamp of claim 4, wherein the total emission area is substantially equal to the coverage area of the heat lamp at least four-hundred millimeters (400 mm) off the floor.

6. The heat lamp of claim 3, and further comprising an end reflector positioned on opposite ends of the reflective sheet, and each end reflector is combined to the outer sheet with a floating connection to minimize conduction of heat from the reflective sheet to the outer sheet.

7. The heat lamp of claim 6, wherein the floating connection comprises of tabs that extend into corresponding slots to minimize conduction of heat from the reflective sheet to the outer sheet.

8. The heat lamp of claim 3, wherein the outer sheet is combined to the reflective sheet by an insulating standoff that prevent heat conduction from the reflective sheet to the outer sheet.

9. The heat lamp of claim 1, wherein the heat source is configured for an operating range of 140 to 160 Watts, inclusive and any value in between.

10. The heat lamp of claim 9, wherein the heat source is configured to operate at one hundred and twenty volts ac (120V).

11. The heat lamp of claim 1, wherein the heat source comprises tubular incoloy heating element sixteen to eighteen inches long, inclusive.

12. A method of using a heat lamp to entice piglets to a coverage area on a floor of a farrowing pen away from a sow, the method comprising:
- providing a heat lamp with a heat source centered at a focus of a parabolic reflective sheet with an aspect ratio of substantially 1/4 and surrounding the parabolic reflective sheet with an outer sheet and forming an insulation gap between the outer sheet and the parabolic reflective sheet;
- selecting the coverage area on the floor of the farrowing pen away from the sow;
- providing a visual indication of a total emission area with an indicator light connected in parallel to the heat source; and
- positioning the heat source directly above the coverage area at a height of at least four-hundred millimeters (400 mm) from the floor, wherein an opening of the heat lamp has dimensions substantially equal to the coverage area on the floor.

13. The method of claim 12, and further comprising positioning the heat lamp such that the coverage area of the heat lamp is warmer than it is near the sow to entice the piglets away from the sow to keep warm and away from the sow to prevent layons.

14. The method of claim 12, and further comprising directing substantially sixty-five percent (65%) of the energy from the heat source directly downward from the parabolic reflective sheet into the coverage area on the floor away from the sow.

15. The method of claim 12, and further comprising operating the heat lamp in a range of 140 to 160 Watts, inclusive and any value in between, at 120 VAC.

16. The method of claim 12, and further comprising positioning the heat source of the heat lamp between four-hundred millimeters (400 mm) and one thousand millimeters (1000 mm) above the coverage area on the floor.

17. The method of claim 16, and further comprising heating the coverage area on the floor with the heat lamp such that the temperature at the coverage area is substantially consistent across its dimensions.

18. The method of claim 12, wherein the heat coming from the total emission area of the heat lamp is substantially equal to the heat arriving at the coverage area on the floor when the heat source of the heat lamp is positioned between four-hundred millimeters (400 mm) and one thousand millimeters (1000 mm) above the coverage area on the floor.

19. The method of claim 14, providing the heat lamp with an outer sheet that surrounds the parabolic reflective sheet and forms an insulation gap between the parabolic reflective sheet and the insulation gap to create a pair of second openings on opposite sides of the parabolic reflective sheet, and wherein the heat lamp has a total emission area comprising dimensions of an opening of the parabolic reflective sheet and the pair of second openings, wherein the pair of second openings forms a heat amplifier to increase efficiency of the heat lamp such that more than sixty-five percent (65%) of the energy from the heat source reaches the coverage area on the floor away from the sows.

* * * * *